US010391757B2

(12) United States Patent
Proctor et al.

(10) Patent No.: US 10,391,757 B2
(45) Date of Patent: Aug. 27, 2019

(54) DEVICE FOR FACILITATING REPETITIVE MANUFACTURE OF PARTS HAVING PRECISIONALLY POSITIONED COMPONENTS WITH A THREE-DIMENSIONAL OBJECT PRINTER

(71) Applicant: Xerox Corporation, Norwalk, CT (US)

(72) Inventors: Douglas E. Proctor, Rochester, NY (US); Timothy J. Clark, Weedsport, NY (US); Joseph M. Ferrara, Jr., Webster, NY (US)

(73) Assignee: Xerox Corporation, Norwalk, CT (US)

( * ) Notice: Subject to any disclaimer, the term of this patent is extended or adjusted under 35 U.S.C. 154(b) by 195 days.

(21) Appl. No.: 15/279,651

(22) Filed: Sep. 29, 2016

(65) Prior Publication Data

US 2018/0086006 A1 Mar. 29, 2018

(51) Int. Cl.

| | |
|---|---|
| ***B33Y 10/00*** | (2015.01) |
| ***B33Y 50/02*** | (2015.01) |
| ***B33Y 30/00*** | (2015.01) |
| ***B29C 64/112*** | (2017.01) |
| ***B29C 64/135*** | (2017.01) |
| ***B29C 64/386*** | (2017.01) |
| ***B29C 64/40*** | (2017.01) |

(52) U.S. Cl.
CPC ............ *B33Y 50/02* (2014.12); *B29C 64/112* (2017.08); *B29C 64/135* (2017.08); *B29C 64/386* (2017.08); *B29C 64/40* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 6,554,510 B1 | 4/2003 | Hayashi et al. | |
| 6,804,124 B2 | 10/2004 | Takahashi | |
| 8,827,675 B2 | 9/2014 | Yamazaki et al. | |
| 2015/0146159 A1* | 5/2015 | Archer ............ | B29D 11/00144 351/159.03 |
| 2015/0202888 A1 | 7/2015 | Miyashita et al. | |
| 2016/0207262 A1* | 7/2016 | Trowbridge .......... | B29C 64/386 |

* cited by examiner

*Primary Examiner* — Jacob T Minskey
(74) *Attorney, Agent, or Firm* — Maginot Moore & Beck LLP

(57) ABSTRACT

A printer is configured with positioning members that hold components at predetermined positions to enable a controller operating at least one printhead in a three-dimensional object printer to form structure about the components. The positioning members can then be removed from the printed three-dimensional object to enable continued formation of the three-dimensional object.

7 Claims, 3 Drawing Sheets

DEVICE FOR FACILITATING REPETITIVE MANUFACTURE OF PARTS HAVING PRECISIONALLY POSITIONED COMPONENTS WITH A THREE-DIMENSIONAL OBJECT PRINTER

TECHNICAL FIELD

This disclosure relates generally to three-dimensionally printed objects, and more particularly to the manufacture of three-dimensionally printed objects having precisely positioned components.

BACKGROUND

Digital three-dimensional object manufacturing, also known as digital additive manufacturing, is a process of making a three-dimensional solid object from a digital model. Three-dimensional object printing is an additive process in which successive layers of material are formed on a substrate in different shapes. The layers can be formed by ejecting binder material, directed energy deposition, extruding material, ejecting material, fusing powder beds, laminating sheets, or exposing liquid photopolymer material to a curing radiation. The substrate on which the layers are formed is supported either on a platform that can be moved three dimensionally by operation of actuators operatively connected to the platform, or the material deposition devices are operatively connected to one or more actuators for controlled movement of the deposition devices to produce the layers that form the object. Three-dimensional object printing is distinguishable from traditional object-forming techniques, which mostly rely on the removal of material from a work piece by a subtractive process, such as cutting or drilling.

One shortcoming in the production of three-dimensional objects is precise positioning of pre-fabricated components within an object. Currently, precise positioning of components in subtractive manufacturing methods is achieved by precision machining of mounting and locating features for components within a casting that contains the components. The costs associated with the machining process to form these features as well as the subsequent inspection to verify the tolerances of the machining are steep. In order to incorporate precisely positioned components in a three-dimensionally printed objects, a portion of the three-dimensionally printed object needs to be printed, the printed structure cured, the components installed, and the remainder of the object printed. This intermingling of operations and reliance on freshly printed structures in the object to hold the components and maintain the precise positioning of the components is difficult to achieve. Thus, a three-dimensional object printer that can form objects with precisely positioned components would be useful.

SUMMARY

A printer that enables the manufacture of three-dimensionally printed objects having precisely positioned components includes a support member configured to support a three-dimensional object to be formed by a three-dimensional object printer, at least one positioning member mounted to the support member, the at least one positioning member being configured to hold a component at a predetermined position with reference to the support member, at least one printhead configured to eject drops of material towards the support member, an actuator operatively connected to the at least one printhead, and a controller operatively connected to the at least one printhead and the actuator. The controller is configured to operate the actuator to move the at least one printhead over the support member and to operate the printhead to eject drops of material towards the support member to enable the at least one printhead to form the three-dimensional object about the component held by the at least one positioning member and to enable the three-dimensional object and the component to be released from the at least one positioning member after the three-dimensional object is formed about the component.

A manufacturing method that uses a device to facilitate the manufacture of three-dimensionally printed objects having precisely positioned components includes mounting at least one positioning member on a support member, mounting components within the positioning members to hold the component at a predetermined position with reference to the support member, operating with a controller at least one printhead to eject drops of material to form object structure about the positioned components while the controller operates an actuator to move the at least one printhead with reference to the support member, operating a curing device with the controller to cure the object structure, and removing the component positioning device from the object structure.

BRIEF DESCRIPTION OF THE DRAWINGS

The foregoing aspects and other features of the present disclosure are explained in the following description, taken in connection with the accompanying drawings.

DETAILED DESCRIPTION

Figure 1:
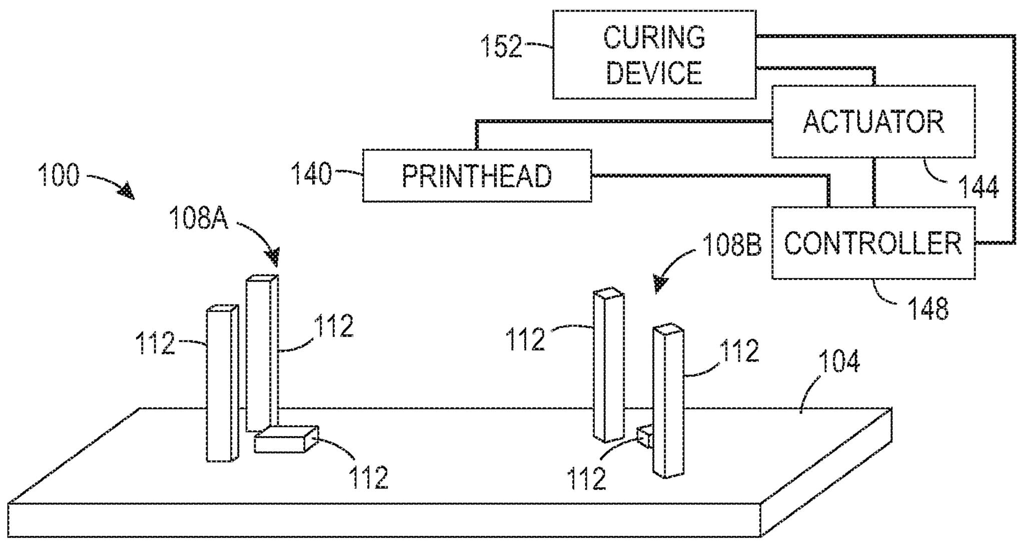
FIG. 1 is an embodiment of a device that facilitates manufacture of an object incorporating precisely positioned components.

For a general understanding of the present embodiments, reference is made to the drawings. In the drawings, like reference numerals have been used throughout to designate like elements.

FIG. 1 depicts a component positioning device that enables repetitive manufacture of three-dimensionally printed objects having precisely positioned parts with a three-dimensional object printer. The component positioning device 100 includes a support member 104, which is configured to support a three-dimensional object to be formed by a three-dimensional object printer, and at least one positioning member, which is mounted to the support member 104. As shown in the figure, the support member 104 is a planar structure, but in other embodiments of the device 100, the support member can be cylindrical, circular, or irregularly shaped. The embodiment shown in FIG. 1 to FIG. 4 has two positioning members 108A and 108B, although other embodiments can have fewer or more positioning members. The positioning members 108A and 108B are configured to hold a component at a predetermined position with reference to the support member to enable the three-dimensional object printer to form the three-dimensional object about the components held by the positioning members.

Figure 2:
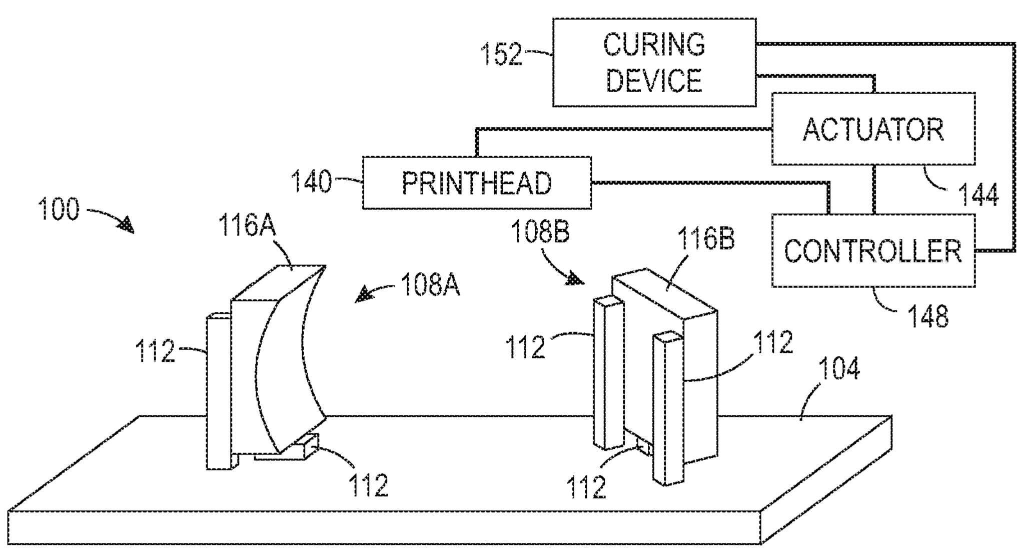
FIG. 2 depicts two optical lenses precisely positioned by the device of FIG. 1.

The first positioning member 108A is mounted to the support member 104 and the second positioning member 108B is mounted to the support member 104. The first positioning member 108A is configured to hold a first component at a first predetermined position with reference to the support member 104 and the second positioning member 108B is configured to hold a second component at a second predetermined position with reference to the support member 104. The first positioning member 108A has three protuberances 112 that are arranged in a triangular configuration to enable two of the protuberances 112 to support different sides of a component 116A as shown in FIG. 2, while the third protuberance 112 holds the component against the first two protuberances. Similarly, the second positioning member 108B has three protuberances 112 that are arranged in a triangular configuration to enable two of the protuberances 112 to support different sides of a component 116B as shown in FIG. 2, while the third protuberance 112 holds the component 116B against the first two protuberances. Other configurations of protuberances or indentations can be used to form positioning members. As used in this document, positioning member refers to any structure configured to hold a previously fabricated component at a particular position, orientation, or location so a three-dimensional object can be printed to incorporate the previously fabricated component within the object. One or more positioning members can be configured to constrain a previously fabricated component in one, two, or three dimensions while an object is printed about the component.

The support member 104 and the positioning members 108A and 108B are within a three-dimensional object printer having at least one printhead 140, an actuator 144, a curing device 152, and a controller 148. The controller 148 is operatively connected to the at least one printhead 140, the actuator 144, and the curing device 152 and is configured to operate these devices. Specifically, the controller 148 is configured with programmed instructions stored in a memory operatively connected to the controller that cause the controller 148 to operate these devices when the instructions are executed. The controller operates the actuator 144 to move the at least one printhead 140 and the curing device 152 with reference to the surface of the support member 104. The controller 148 operates the at least one printhead 140 as it operates the actuator 144 to move the at least one printhead 140 to eject drops of material towards the support member 104 to form object structure and object support structure. The controller 148 operates the curing device 152 as it operates the actuator 144 to move the curing device 152 to cure object structure. The curing device 152 can be a radiator of ultraviolet (UV) radiation or some other wavelength of electromagnetic radiation.

In FIG. 2, the components 116A and 116B are optical lenses that are held at a focal length from one another by the first positioning member 108A and the second positioning member 108B. Other types of components that require precise positioning with reference to one another can be used with another embodiment of device 100. Such components include other optical components used to shape laser beams or micro electromechanical system components used to form accelerometers or other sensing instruments. Installing the components 116A and 116B within the positioning members 108A and 108B enables the printing of a three-dimensional object about the components, rather than requiring the positioning features of the object to be formed first and then the components installed within the object as part of its manufacture.

Figure 3:
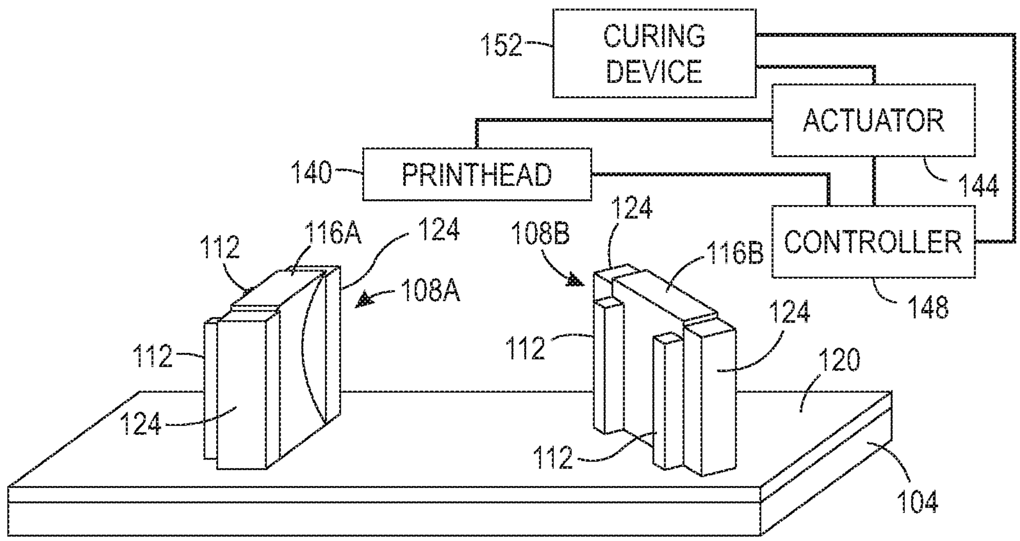
FIG. 3 depicts a printed structure of an object that incorporates the precisely positioned lenses of FIG. 2.
Figure 4:
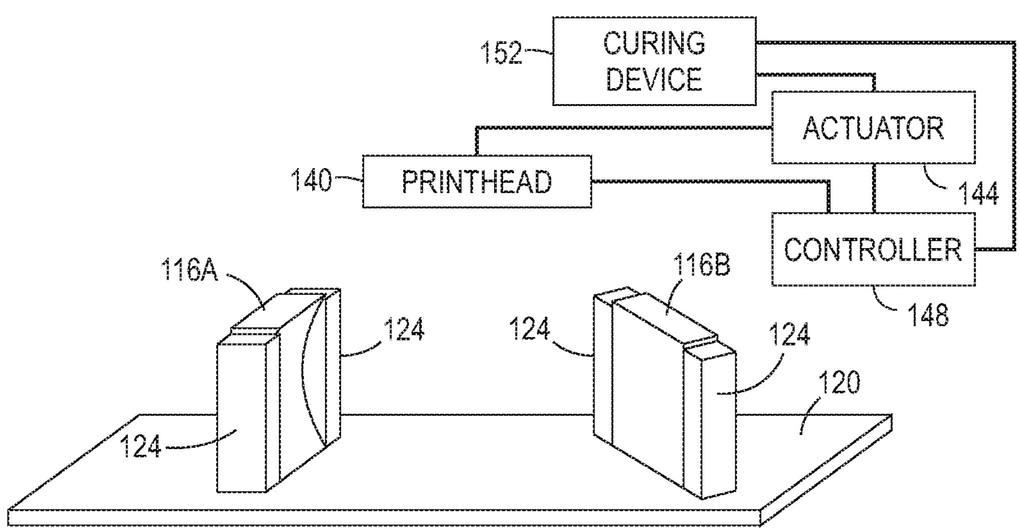
FIG. 4 depicts the printed structure of the object that incorporates the precisely positioned lenses freed from the device shown in FIGS. 1, 2, and 3.

As shown in FIG. 3, the controller 148 operates inkjets within the at least one printhead 140 to form a base structure 120 and supporting structures 124 that secure the two components 116A and 116B at the two precisely positioned locations determined by positioning members 108A and 108B. The controller 148 can operate the at least one printhead 140 to eject materials having different coefficients of thermal expansion. Such materials help maintain the spatial relationships between the components as the object is heated and cooled. From time to time, the controller 148 operates the curing device 152 as it operates the actuator 144 to move the curing device over the support member 104 to cure the drops of ejected material. In FIG. 4, the device 100 has been removed after the printed structure has been cured. To enable removal of the device 100, the printer is operated to form the structure 120 with openings about the protuberances 112 so the protuberances of the device 100 do not adhere to or are entangled with printed structures 120 and 124. Once the device 100 is removed from the object having base structure 120, the device is available for installing another set of components for the formation of a new object incorporating precisely positioned components as determined by the positioning members of the device 100. The reuse of the device 100 enables multiple objects to be manufactured with precisely positioned components without the machining of a part with high tolerances each time.

A process 500 for operating a printing system with a device 100 configured as described above is shown in FIG. 5. Statements that the process is performing some task or function refers to a controller or general purpose processor executing programmed instructions stored in non-transitory computer readable storage media operatively connected to the controller or processor to manipulate data and operate one or more components in the system to perform the task or function. The controller of the printing system can be configured with components and programmed instructions to provide a controller or processor that performs the process 500. Alternatively, the controller can be implemented with more than one processor and associated circuitry and components, each of which is configured to form one or more tasks or functions described below.

Figure 5:
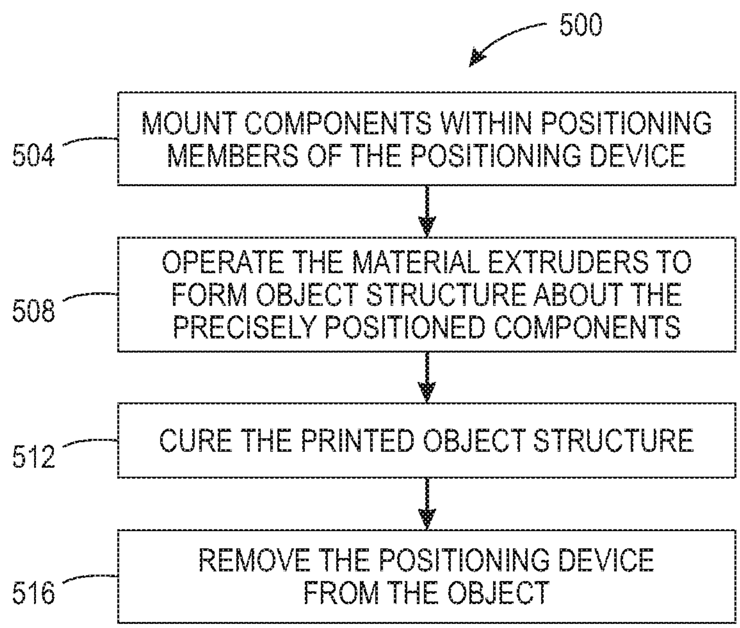
FIG. 5 is a flow diagram of a process for operating a printer with a device that facilitates the manufacture of an object incorporating precisely positioned components.

With reference to FIG. 5, the process 500 begins with mounting the positioning members on the support member and the mounting of components within the positioning members of the component positioning device 100 (block 504). The controller of the printer operates one or more printheads of the printer to form object structure about the two precisely positioned components (block 508). This object structure can include structures made with different materials having different coefficients of thermal expansion. The different coefficients of thermal expansion enable the components to maintain their original distance relationships with one another as the object is heated and cooled. Standard machining or subtractive manufacturing methods do not accommodate the use of different thermal expansion materials so easily. Additionally, the object structure can include the formation of mounting holes and members so the object formed by the process 500 can be easily and quickly incorporated in another object or device. The positioning members also permit partial structures to be built about one or more components, the positioning members removed, and the partial structures completed. The term "printheads" refers to any device capable of forming an object or support structure for forming an object with one or more materials.

Such devices include printheads, extruders, stereolithography systems, and the like. The printed structure is cured (block 512) and the device 100 is removed from the object (block 516). To enable removal of the device 100, the printer is operated to form the object structure about the positioning members with openings that enable the positioning members not adhere to or become entangled with printed structure. Once the device is removed from the object, the device is available for installing another set of components for the formation of a new object incorporating precisely positioned components as determined by the positioning members of the device 100.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A printer that enables repetitive manufacture of three-dimensionally printed objects having precisely positioned parts comprising:

a support member configured to support a three-dimensional object to be formed by a three-dimensional object printer;

at least one positioning member mounted to the support member, the at least one positioning member being configured to hold a component at a predetermined position with reference to the support member and the at least one positioning member having a first positioning member mounted to the support member, the first positioning member being configured to hold a first optical lens at a first predetermined position with reference to the support member, and a second positioning member mounted to the support member, the second positioning member being configured to hold a second optical lens at a second predetermined position with reference to the support member, a distance between the first predetermined position and the second predetermined position corresponds to a focal length between the first optical lens and the second optical lens;

at least one printhead configured to eject drops of material towards the support member;

an actuator operatively connected to the at least one printhead; and a controller operatively connected to the at least one printhead and the actuator, the controller being configured to operate the actuator to move the at least one printhead over the support member and to operate the printhead to eject drops of material towards the support member to form the three-dimensional object about the first optical lens held by the first positioning member of the at least one positioning member and the second optical lens held by the second positioning member of the at least one positioning member to incorporate the first optical lens and the second optical lens within the three-dimensional object without adhering the three-dimensional object to the first positioning member and the second positioning member of the at least one positioning member after the three-dimensional object is formed about the first optical lens and the second optical lens.

2. The printer of claim 1, the at least one positioning member further comprising:

a plurality of protuberances that extend above a surface of the support member.

3. The printer of claim 2 wherein the plurality of protuberances that extend above the surface of the support member are arranged in a triangular configuration.

4. The printer of claim 1, the first positioning member further comprising:

a first plurality of protuberances that extend above a surface of the support member; and the second positioning member further comprising:

a second plurality of protuberances that extend above the support member.

5. The printer of claim 4 wherein the first plurality of protuberances is arranged in a first triangular configuration and the second plurality of protuberances is arranged in a second triangular configuration.

6. The printer of claim 1, the at least one printhead being configured to eject drops of different materials having different coefficients of thermal expansion; and the controller being further configured to operate the at least one printhead to eject drops of a material having a first coefficient of thermal expansion to form structure about the first optical lens and to operate the at least one printhead to eject drops of another material having a second coefficient of thermal expansion to form structure about the second optical lens, the first coefficient of thermal expansion being different than the second coefficient of thermal expansion.

7. The printer of claim 1, the controller being further configured to operate the at least one printhead to eject drops of material to form mounting structure about the first optical lens and the second optical lens to enable the object formed about the first optical lens and the second optical lens to be installed in another object.

* * * * *